(12) United States Patent
Schwill et al.

(10) Patent No.: US 11,951,861 B2
(45) Date of Patent: Apr. 9, 2024

(54) DEVICE AND METHOD FOR DETERMINING A POSITION OF A VEHICLE RELATIVE TO A CHARGING MODULE

(71) Applicant: Daimler AG, Stuttgart (DE)

(72) Inventors: Christoph Schwill, Stuttgart (DE); Stefan Weis, Tuebingen (DE)

(73) Assignee: Daimler AG, Stuttgart (DE)

( * ) Notice: Subject to any disclaimer, the term of this patent is extended or adjusted under 35 U.S.C. 154(b) by 407 days.

(21) Appl. No.: 17/282,200

(22) PCT Filed: Sep. 27, 2019

(86) PCT No.: PCT/EP2019/076134
§ 371 (c)(1),
(2) Date: Apr. 1, 2021

(87) PCT Pub. No.: WO2020/069986
PCT Pub. Date: Apr. 9, 2020

(65) Prior Publication Data
US 2021/0339644 A1  Nov. 4, 2021

(30) Foreign Application Priority Data
Oct. 2, 2018 (DE) .................. 10 2018 007 797.8

(51) Int. Cl.
*B60L 53/37* (2019.01)
*B60L 53/12* (2019.01)
(Continued)

(52) U.S. Cl.
CPC .............. *B60L 53/37* (2019.02); *B60L 53/12* (2019.02); *B60Q 1/143* (2013.01); *G01S 17/00* (2013.01); *F21S 41/30* (2018.01)

(58) Field of Classification Search
CPC .......... B60L 53/37; B60L 53/12; B60L 53/36; B60L 53/38; B60Q 1/143; B60Q 2300/45;
(Continued)

(56) References Cited

U.S. PATENT DOCUMENTS

2007/0046779 A1  3/2007 Sourlier
2014/0092236 A1  4/2014 Findeisen et al.

FOREIGN PATENT DOCUMENTS

CN   1910626 A   2/2007
CN   101680754 A   3/2010
(Continued)

OTHER PUBLICATIONS

PCT/EP2019/076134, International Search Report dated Dec. 17, 2019 (Two (2) pages).
(Continued)

*Primary Examiner* — Rodney A Butler
(74) *Attorney, Agent, or Firm* — Crowell & Moring LLP

(57) ABSTRACT

A device for determining a position of a vehicle includes a camera system, a digital headlight system having a left digital headlight and a right digital headlight, and a data processing unit. The data processing unit is configured to assign a first detected reflected light beam by the camera system to the left digital headlight with a first angle, assign a second detected reflected light beam by the camera system to the right digital headlight with a second angle, and trigonometrically determine a distance of the vehicle from a charging module in a direction of a longitudinal axis of the vehicle and an offset in a transverse direction with respect to the longitudinal axis on a basis of the first and second angles and a distance between the left digital headlight and the right digital headlight.

5 Claims, 3 Drawing Sheets

(51) Int. Cl.
*B60Q 1/14* (2006.01)
*G01S 17/00* (2020.01)
*F21S 41/30* (2018.01)

(58) Field of Classification Search
CPC .......... G01S 17/00; G01S 17/48; G01S 17/86;
G01S 17/931; F21S 41/30; Y02T 10/70;
Y02T 10/7072; Y02T 90/12; Y02T 90/14;
H02J 50/90
See application file for complete search history.

(56) References Cited

FOREIGN PATENT DOCUMENTS

| | | | |
|---|---|---|---|
| CN | 103217303 A | 7/2013 | |
| CN | 103712556 A | 4/2014 | |
| CN | 104520135 A | 4/2015 | |
| CN | 104903680 A | 9/2015 | |
| CN | 106934808 A | 7/2017 | |
| CN | 108459414 A | 8/2018 | |
| CN | 108474853 A | 8/2018 | |
| DE | 102013215649 A1 * | 2/2015 | .......... B60L 11/1805 |
| DE | 10 2013 227 129 A1 | 6/2015 | |
| DE | 10 2015 210 314 A1 | 12/2016 | |
| DE | 10 2016 013 180 A1 | 5/2017 | |
| EP | 1 628 141 A1 | 2/2006 | |
| JP | 2002-22830 A | 1/2002 | |
| JP | 2010-160035 A | 7/2010 | |
| JP | 2013-44690 A | 3/2013 | |
| KR | 10-2020-0015001 A | 2/2020 | |
| WO | WO 2016/193259 A1 | 12/2016 | |

OTHER PUBLICATIONS

German Search Report issued in German application No. 10 2018 007 797.8 dated Apr. 26, 2019, with Statement of Relevancy (Ten (10) pages).

Chinese-language Chinese Office Action issued in Chinese Application No. 201980065140.8 dated Dec. 21, 2023, with partial English translation (13 pages).

\* cited by examiner

DEVICE AND METHOD FOR DETERMINING A POSITION OF A VEHICLE RELATIVE TO A CHARGING MODULE

BACKGROUND AND SUMMARY OF THE INVENTION

The invention relates to a device and a method for determining a position of a vehicle relative to a charging module.

In the inductive charging of hybrid and electric vehicles for example, the aim is to position the vehicle as precisely as possible above a charging coil in the ground in order to achieve good magnetic coupling between a coil in the vehicle and the charging coil, since the two coils must be positioned as precisely as possible relative to each other in order to achieve the highest possible efficiency. Positioning by means of magnetic pulses from the vehicle and amplitude and phase detection on the sides of the charging coil in the ground is known. Such magnetic methods for position detection are strongly influenced by the respective environmental conditions, for example reinforcements in the floor, garage doors, material of the vehicle chassis. In addition, the energy transfer is also based on magnetic principles, such that the basic functionality of inductive charging can also affect positioning by means of magnetic methods.

From DE 10 2016 013 180 A1, a method for positioning a motor vehicle relative to an inductive charging device arranged in the vicinity of the motor vehicle is known, in which a front axle steering and a rear axle steering of the motor vehicle are automatically actuated by means of an electronic computing device, in order to position the motor vehicle relative to the charging device, having the steps:

by means of at least one camera of the motor vehicle: detecting at least one marking associated with the charging device and characterising a position of the charging device in the vicinity of the motor vehicle; and by means of the electronic computing device: automatically actuating the front axle steering and the rear axle steering depending on the detected marking.

The object of the invention is to specify an improved device and an improved method for determining a position of a vehicle relative to a charging module arranged in the vicinity of the motor vehicle.

A device according to the invention for determining a position of a vehicle having an energy storage device chargeable by a charging module arranged in the vicinity of the vehicle comprises a camera system, wherein a digital headlight system having a left digital headlight and a right digital headlight is provided, which are spaced apart from each other by a distance, wherein each of the two digital headlights are adapted to project digital light beams by scanning at different angles in such a way that, at any given time, only one of the digital headlights emits a light beam at a particular angle at a time, wherein the camera system is adapted to detect a reflected light beam of the light beam from a reflector arranged in the zero point of the charging module, wherein a data processing unit is provided in the vehicle, which is adapted to assign detected reflected light beams to the respective emitting digital headlight with the respective angle and, when reflected light beams of both digital headlights with the respective angle are detected, to trigonometrically determine a distance of the vehicle from the charging module in the direction of a longitudinal axis of the vehicle and an offset in the transverse direction with respect to the longitudinal axis on the basis of the detected angles and the distance between the digital headlights.

In a method according to the invention for determining a position of a vehicle having an energy storage device that can be charged by a charging module arranged in the vicinity of the vehicle, wherein the vehicle comprises a camera system, and wherein a digital headlight system having a left digital headlight and a right digital headlight is provided, which are spaced apart from each other by a distance, each of two digital headlights is controlled to project digital light beams by scanning at different angles in such a way that, at any given time, only one of the digital headlights emits the light beam at a particular angle at a time, wherein the camera system detects a light beam of the light beam reflected by a reflector arranged in the zero point of the charging module, wherein detected reflected light beams are assigned to the respective emitting digital headlight with the respective angle and, upon detection of reflected light beams of both digital headlights with the respective angle, a distance of the vehicle from the charging module in the direction of the longitudinal axis of the vehicle as well as an offset in the transverse direction to the longitudinal axis is trigonometrically determined on the basis of the detected angles and the distance between the digital headlights.

By means of the solution according to the invention, it is possible to determine the exact position of the vehicle relative to the charging module by means of a camera system that may already be present, wherein the exact position of the camera system in the vehicle is irrelevant. The digital headlight system can also already be provided in the vehicle. Additional sensor technology may therefore not be required. Unlike magnetic methods for determining position, dependence on environmental conditions is reduced and less susceptible to interference. In contrast to camera-based systems in the underbody, there is less risk of soiling. Detection of the reflected light and assignment to the respective emitting digital headlight with the associated beam angle is also much more robust then a detection of the charging module by means of image analysis. With the exception of the reflector arranged on the charging module, the position sensor technology is located exclusively on the vehicle, such that interoperability with different charging modules is possible.

Exemplary embodiments of the invention are explained in more detail below with reference to drawings.

DETAILED DESCRIPTION OF THE DRAWINGS

Figure 1:
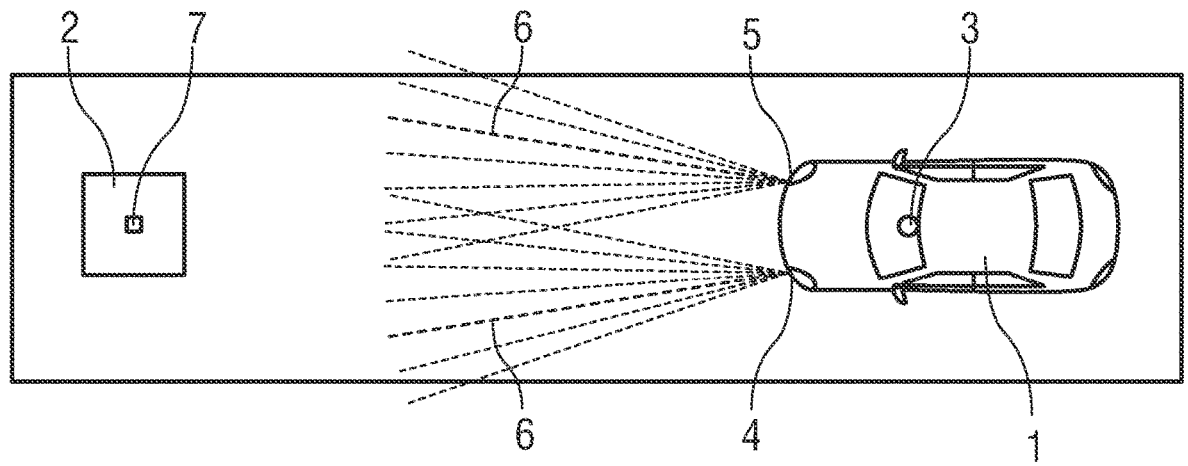
FIG. 1 is a schematic view of a vehicle of a charging module.

Corresponding parts are provided with the same reference numerals in all figures.

FIG. 1 is a schematic view of a vehicle 1, in particular a hybrid or electric vehicle, and a charging module 2 embedded in a floor, for example. The charging module 2 comprises a charging coil. The vehicle 1 comprises a coil for magnetic coupling with the charging coil of the charging module 2 and an energy storage device, for example an accumulator, that can be charged by means of the coil.

The charging module 2 is connected to a power grid, for example, which can provide electrical energy.

The vehicle 1 has an optical sensor 3, for example a camera system, which is aligned forwards in the direction of travel, for example, and may be provided in the vehicle 1 anyway. However, the optical sensor 3 can also be designed as a simple light-sensitive component.

Furthermore, the vehicle 1 has a digital headlight system having a left digital headlight 4 and a right digital headlight 5. In this context, a "digital headlight" is intended to mean in particular a headlight having at least two, in particular a plurality of, separately controllable light points, in particular light pixels. Preferably, this is intended to mean in particular a headlight having a plurality of light points, in particular light pixels and/or LED-light points. Preferably, this is to be understood to mean in particular a pixel headlight, particularly preferably a DLP headlight, i.e., a digital light processing headlight.

Each of the two digital headlights 4, 5 is designed to project digital light beams 6 at different angles to a longitudinal axis or to a transverse axis of the vehicle 1.

The charging module 2 has a reflector 7 by means of which light beams 6 projected by the digital headlights 4, 5 can be reflected back in the direction of the vehicle 1. When approaching the charging module 2, each of the digital headlights 4, 5 scans the surroundings ahead, i.e., projects light beams 6 with different angles. By way of example, the left digital headlight 4 and the right digital headlight 5 can be activated alternately, such that only one of the digital headlights 4, 5 projects a light beam 6 at a certain angle at any given time.

When approaching the charging module 2, the scanning can be activated by the driver. Alternatively, scanning can be performed permanently in the background in order to detect a charging module 2 in the vicinity.

The digital headlights 4, 5 can be adapted to emit light beams 6 with a certain characteristic, for example wavelength, and the optical sensor 3 can be adapted to receive light beams 6 with this characteristic, and filter out light beams with other characteristics in order to avoid false detections.

Figure 2:
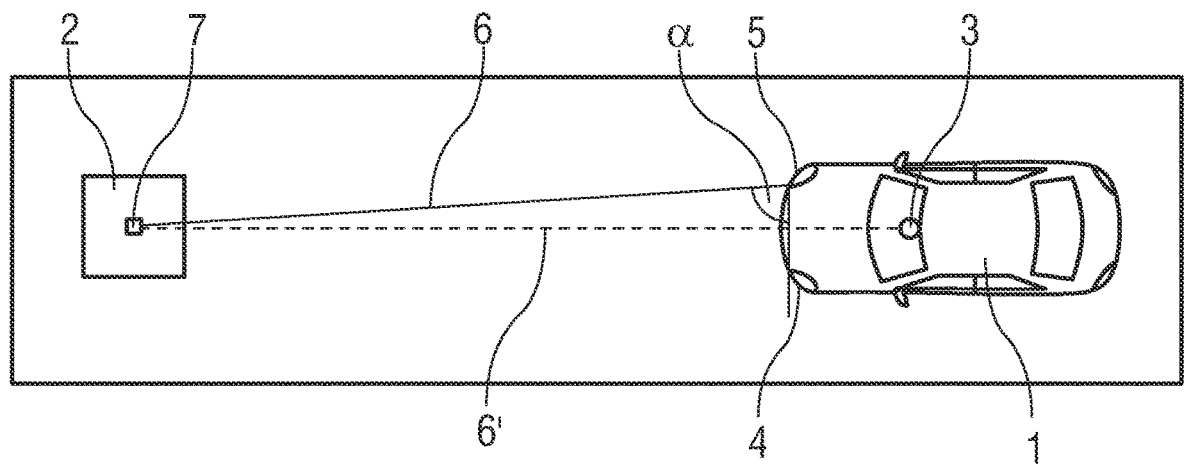
FIG. 2 is a schematic view of the vehicle and the charging module, wherein a right digital headlight emits a light beam at an angle.

FIG. 2 is a schematic view of the vehicle 1 and the charging module 2, wherein only the right digital headlight 5 emits a light beam 6 at a certain angle $\alpha$ to a connecting line between the right digital headlight 5 and the left digital headlight 4. The light beam 6 strikes the reflector 7 and is reflected towards the vehicle 1 as a light beam 6', where it is received by the optical sensor 3. The angle $\alpha$ of the light beam 6 at this time is known in a control unit of the vehicle 1.

Figure 3:
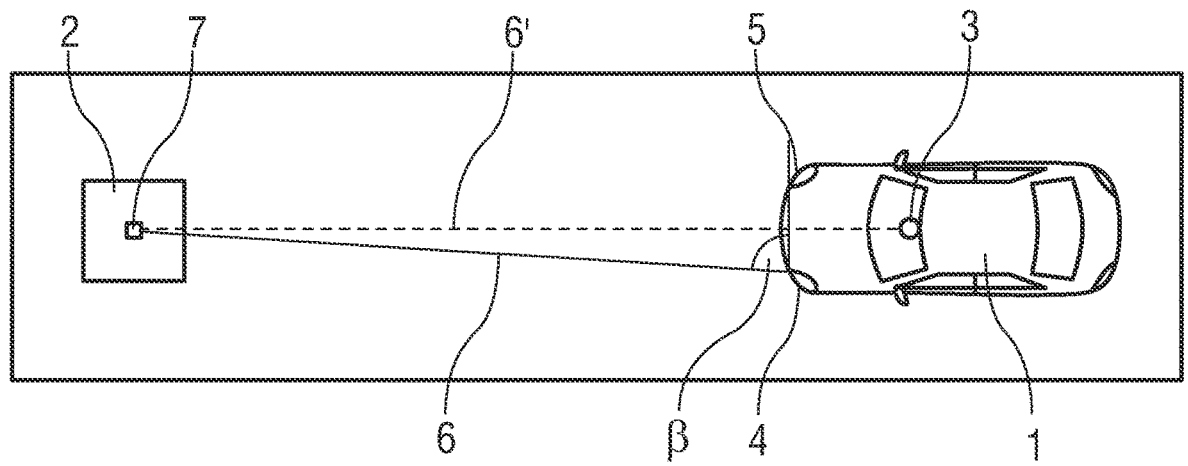
FIG. 3 is a schematic view of the vehicle and the charging module, wherein a left digital headlight emits a light beam at an angle.

FIG. 3 is a schematic view of the vehicle 1 and the charging module 2, wherein only the left digital headlight 4 emits a light beam 6 at a certain angle $\beta$ with respect to the connecting line between the right digital headlight 5 and the left digital headlight 4. The light beam 6 strikes the reflector 7 and is reflected towards the vehicle 1 as a light beam 6', where it is received by the optical sensor 3. The angle $\beta$ of the light beam 6 at this time is known in a control unit of the vehicle 1.

Using trigonometric functions, by knowing the angles $\alpha$ and $\beta$ and the geometry of the vehicle 1 as well as the position of the coil in the vehicle 1, a distance x of the vehicle 1 from the charging module 2 in the direction of the longitudinal axis L as well as an offset y in the transverse direction to the longitudinal axis L can be determined.

A distinction is made between the following cases.

Figure 4:
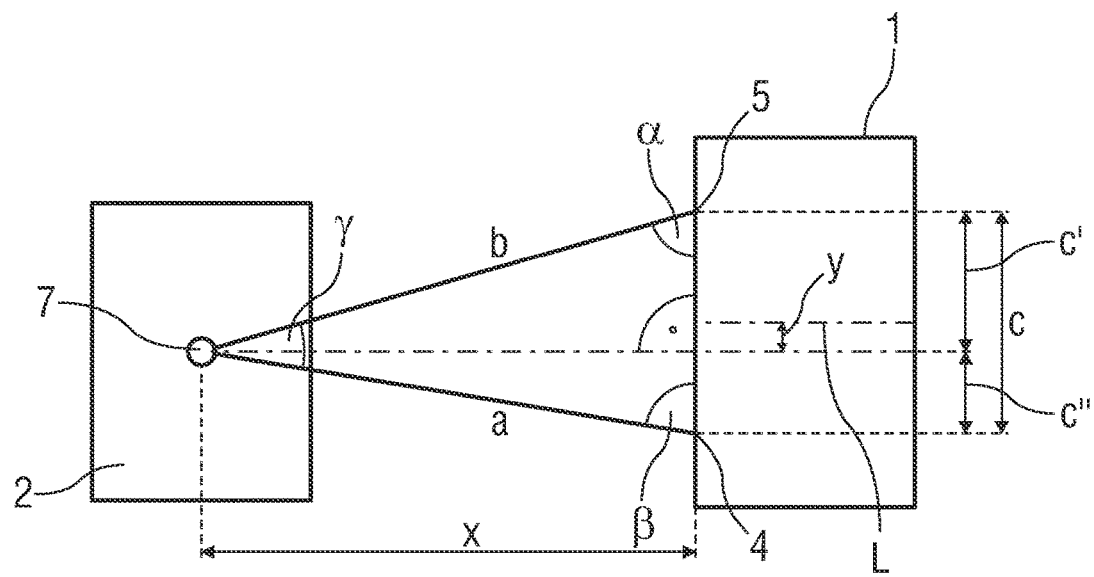
FIG. 4 is a schematic view of geometric relationships of the vehicle and the charging module in a first case.

FIG. 4 is a schematic view of the geometric relationships of the vehicle 1 and the charging module 2 in a first case.

In the first case, both angles $\alpha$ and $\beta$ are greater than 0 and less than 90°. The following applies:

$$\frac{a}{\sin(\alpha)} = \frac{b}{\sin(\beta)} = \frac{c}{\sin(\gamma)},$$

wherein a is the distance between the left digital headlight 4 and the reflector 7, b is the distance between the right digital headlight 5 and the reflector 7, and c is the known distance between the right digital headlight 5 and the left digital headlight 4, such that a, b and c form the sides of a triangle, wherein $\gamma$ is the angle enclosed by a and b. A vertical line x on the distance c passes through the reflector 7 and divides the distance c into two partial distances c' and c", wherein c' is adjacent to the right digital headlight 5 and c" is adjacent to the left digital headlight 4. The angles $\alpha$ and $\beta$ and the distance c are known. Since the sum of $\alpha$, $\beta$ and $\gamma$ in the triangle is 180°, $\gamma$ is also known if $\alpha$ and $\beta$ are known.

It is thus derived that the following applies:

$$b = \frac{\sin(\beta) * c}{\sin(\gamma)}, \ c' = \cos(\alpha) * \frac{\sin(\beta)}{\sin(\gamma)} * c, \ x = \frac{\sin(\alpha) * \sin(\beta)}{\sin(\gamma)} * c,$$

$$y = \frac{c}{2} - c' = \frac{c}{2} - \cos(\alpha) * \frac{\sin(\beta)}{\sin(\gamma)} * c = c\left(\frac{1}{2} - \cos(\alpha) * \frac{\sin(\beta)}{\sin(\gamma)}\right)$$

Figure 5:
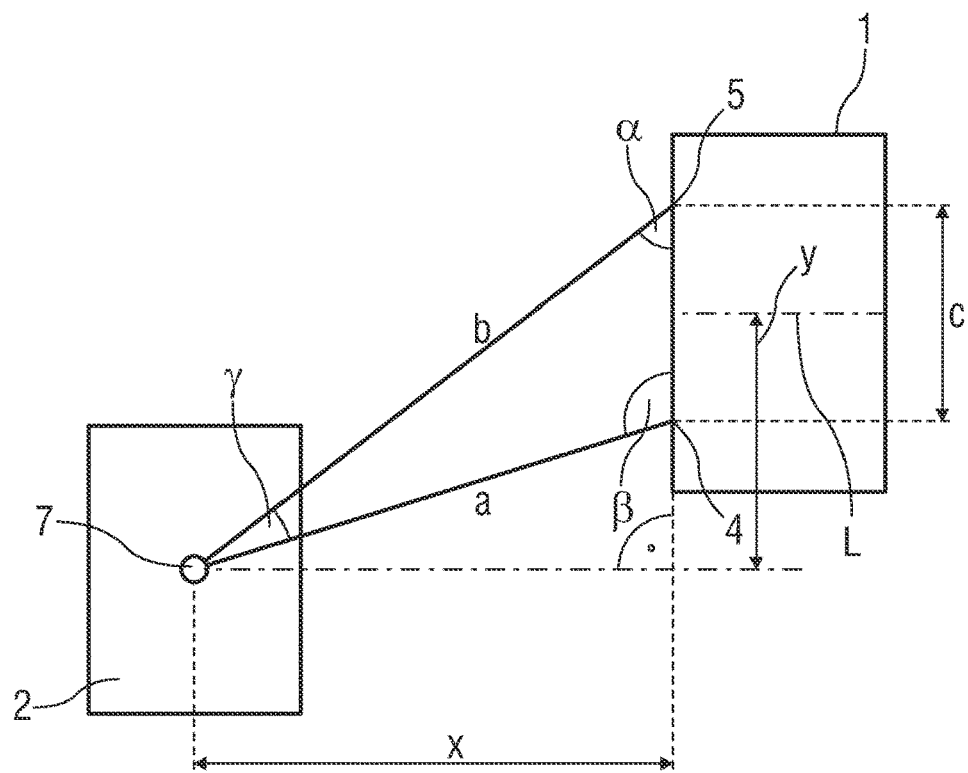
FIG. 5 is a schematic view of geometric relationships of the vehicle and the charging module in a second case.

FIG. 5 is a schematic view of the geometrical relationships of the vehicle 1 and the charging module 2 in a second case.

In the second case, the angle $\alpha$ is greater than 0 and less than 90°, and the angle $\beta$ is greater than or equal to 90°. The vertical line x on the extension of the distance c passes through the reflector 7.

The following applies:

$$x = \sin(\alpha) * b = \sin(\alpha) * \frac{\sin(\beta)}{\sin(\gamma)} * c,$$

$$y = \cos(\alpha) * b - \frac{c}{2} = \cos(\alpha) * \frac{\sin(\beta)}{\sin(\gamma)} * c - \frac{c}{2}$$

Figure 6:
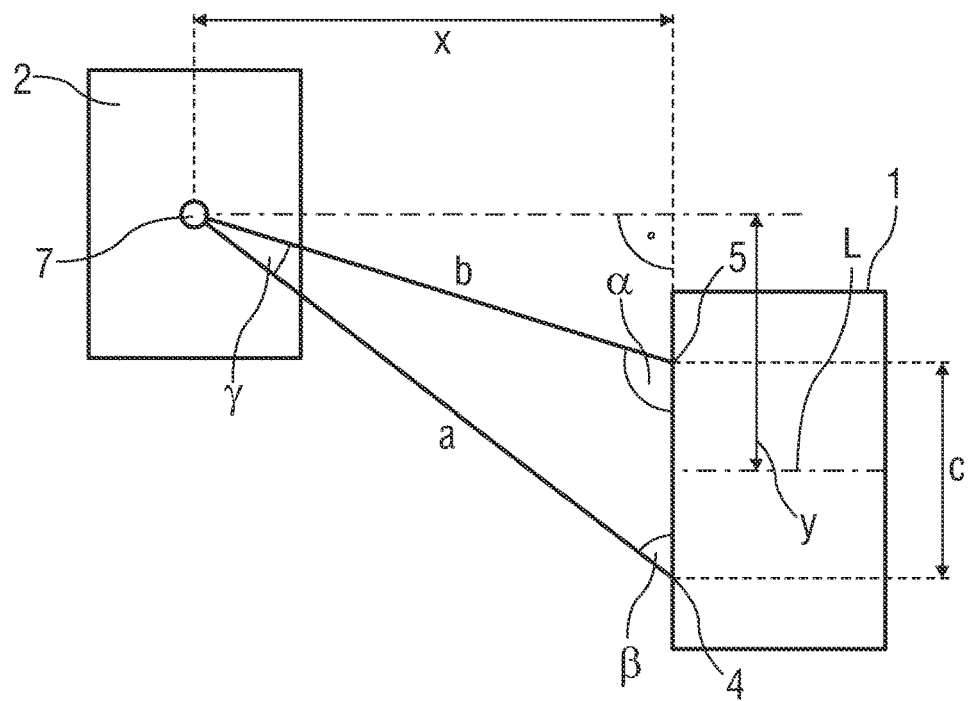
FIG. 6 is a schematic view of geometric relationships of the vehicle and the charging module in a third case.

FIG. 6 is a schematic view of the geometrical relationships of the vehicle 1 and the charging module 2 in a third case.

In the third case, the angle $\alpha$ is greater than or equal to 90°, and the angle $\beta$ is greater than 0 and less than 90°. The vertical line x on the extension of the distance c passes through the reflector 7.

The following applies:

$$x = \sin(\beta) * a = \sin(\beta) * \frac{\sin(\alpha)}{\sin(\gamma)} * c,$$

$$y = \cos(\beta) * a + \frac{c}{2} = \cos(\beta) * \frac{\sin(\alpha)}{\sin(\gamma)} * c + \frac{c}{2}$$

The relative position of the vehicle 1 in relation to the charging module 2 can thus be determined. Based on a determined relative position, driving instructions can be given to the driver in a supportive manner, or the vehicle 1 is positioned automatically based on the determined relative position, such that the charging coil of the charging module 2 is aligned as optimally as possible with the coil of the vehicle 1 for magnetic coupling.

In doing so, the position of the vehicle 1 relative to the charging module 2 can be tracked as long as the reflector 7 is within the field of view of the optical sensor 3. If the vehicle 1 moves outside the field of view of the optical sensor 3, the driver assistance or the automatic positioning for the remaining distance can be performed using odometry data.

The light emitted for triangulation by the digital headlights 4, 5 can differ from the normal light emission of the digital headlights 4, 5 both in intensity and in color/wavelength and can occur on their own or together, i.e., superimposed, with the normal light function.

To distinguish the light of the right digital headlight 5 from the light of the left digital headlight 4, the digital headlights 4, 5 can be activated sequentially. By way of example, an arc is first illuminated by the left digital headlight 4 and then an arc is illuminated by the right digital headlight 5, or vice versa. Alternatively, the light is emitted alternately between the digital headlights 4, 5, wherein a short time interval without light emission can be provided between two beams in order to improve the distinction of the light beams of the two digital headlights 4, 5 reflected by the reflector 7 by means of the optical sensor 3.

Likewise, it is possible to emit the lights of the two digital headlights 4, 5 with different color/wavelength, such that the optical sensor 3 can determine from which of the two digital headlights 4, 5 the light was emitted, depending on the reflected light frequency. Thus, simultaneous scanning by both digital headlights 4, 5 is also possible.

Likewise, temporal offset and different color/wavelength can be used together to ensure that the reflection can be assigned to the left or right digital headlight 4, 5.

Here, the emission of the light beams of each digital headlight 4, 5 can occur simply in a complete arc and thus illuminate the entire surroundings with each pass, or the system always starts at the innermost or outermost angle and stops scanning the arc as soon as the sensor has detected the corresponding reflection and thus further scanning of the remaining arc would be unnecessary. This saves both scanning time and energy, since it is not always necessary to illuminate the entire arc. The shortest scanning time per arc would then also allow an increase in the repetition rates of the scans of the arcs and thus an increase in accuracy, since a relative position of the vehicle in relation to the charging plate can be determined more often.

The reflector 7 can be arranged in a zero point of the coil of the charging module 2. Alternatively, however, it can also be located at another previously known relative position with respect to the base plate of the charging system.

LIST OF REFERENCE CHARACTERS

1 vehicle
2 charging module
3 optical sensor
4 left digital headlight
5 right digital headlight
6 light beam
6' light beam
7 reflector
a distance
α angle
b distance
β angle
c distance
c', c" partial distance
γ angle
L longitudinal axis
x distance, vertical line
y offset

The invention claimed is:

1. A device for determining a position of a vehicle having an energy storage device that is chargeable by a charging module arranged in a vicinity of the vehicle, comprising:
   a camera system;
   a digital headlight system having a left digital headlight and a right digital headlight, wherein there is a distance between the left digital headlight and the right digital headlight; and
   a data processing unit that is configured to:
      assign a first detected reflected light beam by the camera system to the left digital headlight with a first angle and assign a second detected reflected light beam by the camera system to the right digital headlight with a second angle; and
      trigonometrically determine a distance of the vehicle from the charging module in a direction of a longitudinal axis of the vehicle and an offset in a transverse direction with respect to the longitudinal axis on a basis of the first and second angles and the distance between the left digital headlight and the right digital headlight.

2. The device according to claim 1 in combination with a charging module connected to a power grid, wherein the charging module includes a reflector.

3. The device according to claim 1 in combination with a charging module connected to a power grid, wherein the charging module includes a charging coil.

4. A method for determining a position of a vehicle having an energy storage device that is chargeable by a charging module arranged in a vicinity of the vehicle, comprising the steps of:
   assigning a first detected reflected light beam by a camera system to a left digital headlight of the vehicle with a first angle;
   assigning a second detected reflected light beam by the camera system to a right digital headlight of the vehicle with a second angle; and
   trigonometrically determining a distance of the vehicle from the charging module in a direction of a longitudinal axis of the vehicle and an offset in a transverse direction with respect to the longitudinal axis on a basis of the first and second angles and a distance between the left digital headlight and the right digital headlight.

5. The method according to claim 4 further comprising the step of alternately activating the left digital headlight and the right digital headlight to project respective light beams that are reflected as the first detected reflected light beam and the second detected reflected light beam.

* * * * *